United States Patent [19]

Kemp

[11] Patent Number: 5,262,641
[45] Date of Patent: Nov. 16, 1993

[54] COMPENSATION MECHANISM FOR A PRESSURE SENSOR HAVING COUNTERWEIGHT MECHANISM

[75] Inventor: Stephen J. Kemp, St. Paul, Minn.

[73] Assignee: Honeywell Inc., Minneapolis, Minn.

[21] Appl. No.: 987,586

[22] Filed: Dec. 8, 1992

Related U.S. Application Data

[63] Continuation of Ser. No. 816,026, Dec. 30, 1991, abandoned.

[51] Int. Cl.[5] .............................................. G01D 5/34
[52] U.S. Cl. .................................. 250/231.19; 73/705
[58] Field of Search ...................... 250/231.10, 231.19, 250/239; 73/705, 715–717, 723

[56] References Cited

U.S. PATENT DOCUMENTS

| | | |
|---|---|---|
| 3,159,750 | 12/1964 | Kazan . |
| 3,191,440 | 6/1965 | Miller . |
| 3,832,618 | 8/1974 | Levesque et al. ............ 73/718 |
| 3,878,725 | 4/1975 | Gaertner ................. 73/718 |
| 3,946,716 | 3/1976 | Pikul . |
| 4,035,637 | 7/1977 | Leinhart et al. ........... 250/231.19 |
| 4,122,337 | 10/1978 | Okuda et al. . |
| 4,283,114 | 8/1981 | Wandrack . |
| 4,289,963 | 9/1981 | Everett . |
| 4,321,831 | 3/1982 | Tomlinson et al. . |
| 4,342,230 | 8/1982 | Okamura et al. . |
| 4,360,247 | 11/1982 | Beasley . |
| 4,413,634 | 11/1983 | Marchbanks ............... 73/716 |
| 4,466,295 | 8/1984 | Wesson . |
| 4,476,880 | 10/1984 | Giem et al. . |
| 4,501,293 | 2/1985 | Furlong et al. . |
| 4,502,334 | 3/1985 | Gorgens et al. . |
| 4,515,473 | 5/1985 | Mermelstein . |
| 4,531,414 | 7/1985 | Kraus . |
| 4,546,793 | 10/1985 | Stupecky . |
| 4,745,925 | 5/1988 | Dietz . |
| 4,771,640 | 9/1988 | Matsuura . |

Primary Examiner—David C. Nelms
Assistant Examiner—Stephone B. Allen
Attorney, Agent, or Firm—Ian D. MacKinnon

[57] ABSTRACT

A differential pressure sensor with a compensation means, said differential pressure sensor comprising the diaphragm with a first means having a mass mounted upon the diaphragm. The first means is utilized to determine the position of the diaphragm relative to an initial first position and/or to increase the effective area of the diaphragm. A housing contains the diaphragm, the housing has a first and a second inlet port. The first inlet port provides a first pressure to a first side of the diaphragm and the second inlet provides a second pressure to the second side of the diaphragm, the diaphragm moving to the lesser of the two pressures. A counterweight mechanism is located in the housing having a inner arm and an outer arm. The counterweight mechanism pivots about an axis. The center of gravity of the counterweight mechanism is located on the outer arm. The inner arm is in contact with the first means, whereby the counterweight mechanism compensates for the mass added to the diaphragm which enables the pressure sensor to be mounted in any orientation.

18 Claims, 5 Drawing Sheets

COMPENSATION MECHANISM FOR A PRESSURE SENSOR HAVING COUNTERWEIGHT MECHANISM

This application is a continuation of application Ser. No. 07/816,026, filed Dec. 30, 1991, now abandoned.

BACKGROUND OF THE INVENTION

The present invention pertains low pressure airflow sensors. More particularly, it pertains to a sensor which can determine low pressure differentials.

Pressure sensors are utilized most commonly as pressure switches, turning on, as an example, electronic air cleaners when a pressure differential is determined. A pressure switch is disclosed in commonly owned, co-pending application entitled, "Differential Pressure Sensor Utilizing Opto-Reflective Sensor", Ser. No. 07/816,016, filed on this same date, and is hereby incorporated by reference. The switch compares the pressure downstream of the air cleaner to the pressure of the air surrounding the air cleaner. Usually, there is a return duct between the air cleaner and a grill to ambient air. When a return duct is present the pressure differential the airflow switch senses is the pressure differential between the pressure following the air filter and the ambient air pressure.

An example of a prior art pressure switch is U.S. Pat. No. 4,122,337, issued to Okuda et al. The pressure switch illustrated in Okuda et al. is a pressure electrical signal conversion means comprising a diaphragm assembly which is moved in accordance with the difference of pressure between the two compartment therein. Illumination means directs light in a band onto a photo-sensitive unit which includes two elements so disposed that when any particular band of the photo-sensitive area is illuminated, the illuminated area of one element is greater than that of the other. The photo-sensitive element produces an output proportional to the relative size of the illuminated areas of the elements. The photo-sensitive unit of an illumination means being moveable relative to one another in proportion to the movement of the diaphragm. Examples illustrate mounting a plate onto a diaphragm and preventing light from reaching a sensor through a shield until a specified pressure is reached. A second method shown illustrates attaching the sensor itself to the diaphragm, and determining the position of the diaphragm relative to where the light is reflected on the sensor.

As it is common for pressure sensors to have elements mounted upon the diaphragm in order to determine movement of the diaphragm and thereby determine the relative differential pressure, it is necessary to mount the airflow pressure sensor in a specific orientation. This is due to the weight of the material which must be added to the diaphragm. It is common to add materials to the diaphragm to either reflect an optical signal, to block an optical signal or to increase the effective area where optics are not used. The weight of this material will change the sensitivity of the diaphragm dependent upon what the orientation of the diaphragm is relative to the earth's gravitational forces. Therefore, it is necessary when utilizing a pressure sensor of this type to calibrate the sensor in a first orientation and mount that sensor in that same orientation or the pressure sensor will not be accurate. An example would be if a pressure sensor were calibrated in a first position, wherein the diaphragm moves in an up and down motion due to the differential pressure changes. When mounted for use, if the pressure sensor were mounted in a position where the diaphragm moved in a side to side motion relative to the earth's gravity, the material added would not effect the diaphragm in the same manner and accuracy would be lost. Therefore, when utilizing prior art pressure sensors, it is necessary that the pressure sensor be mounted ±10 degrees in the same orientation as it was when calibrated.

Applicant's invention proposes a compensation arm which allows the pressure sensor to be calibrated in a first position and mounted in any orientation which is necessary for use of the pressure sensor.

SUMMARY OF THE INVENTION

In accordance with the principles of the invention, an air pressure sensor is achieved which is not dependent upon the orientation of the air pressure sensor relative to the original orientation of the air pressure sensor when calibrated. The air pressure sensor comprises a diaphragm with a first means having a mass which is mounted upon the diaphragm and is utilized to determine the position of the diaphragm relative to an initial reference position and/or to increase the diaphragm's effective area. A housing contains the diaphragm, and has a first and a second inlet port. The first inlet port provides a first pressure to the first side of the diaphragm and the second inlet port provides a second pressure to a second side of the diaphragm. The diaphragm moves towards the lesser of the two pressures, wherein the first means is utilized to determine the position of the diaphragm and the pressure sensor calculates the differential pressure from this position.

A counterweight mechanism is utilized wherein the counterweight mechanism comprises an inner arm and an outer arm. The inner arm and the outer arm pivot about the axis, the axis is mounted upon a pivot rod which is mounted in the housing. The inner arm is in contact with the first means and provides compensation for its mass. The counterweight mechanism has its center of gravity located on the outer arm, wherein the combination of the weight of the counterweight mechanism and the location of the center of gravity equally compensates for the mass of the first means located on the diaphragm. In this manner, the orientation of the differential pressure sensor is not critical. No matter what orientation the differential pressure sensor is in, the counterweight mechanism equally compensates for the first means.

DESCRIPTION OF THE PREFERRED EMBODIMENT

Airflow switch 1 provides low voltage, on/off control based on negative relative pressure. This embodiment is utilized to control the output of a high voltage switching power supply in an electronic air cleaner. In the electronic air cleaner, airflow switch 1 senses negative pressure in the duct relative to the surrounding air. This occurs when there is airflow in the duct and the pressure drop occurs across the electronic air cleaner prefilter. When a preset pressure is reached, the electronic air cleaner power supply is activated and power is supplied to the electronic air cleaner cells.

Figure 1:
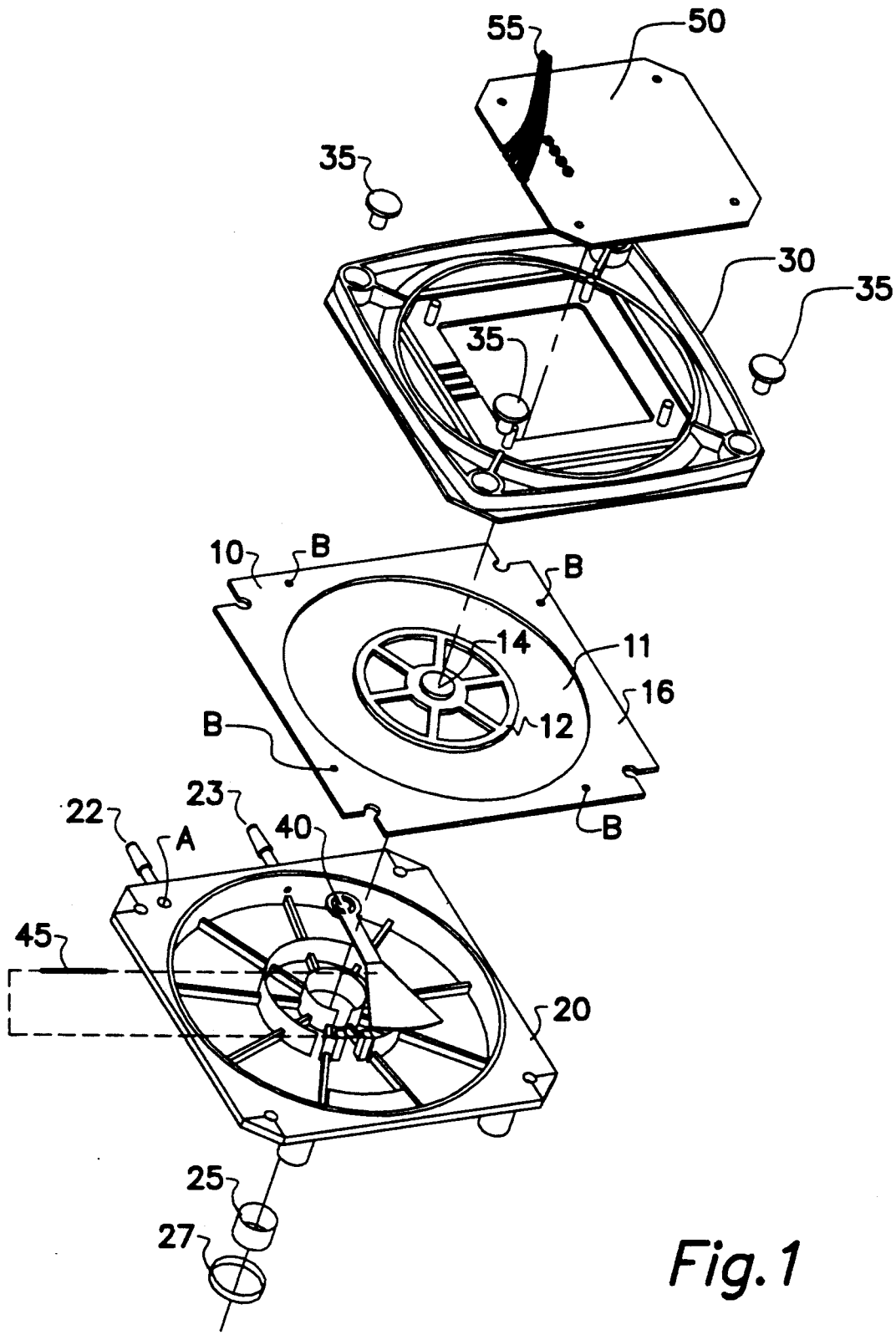
FIG. 1 illustrates the preferred embodiment for an airflow switch.

Airflow switch 1 of FIG. 1 comprises diaphragm assembly 10 which is sealed between two housings, base 20 and cover 30. Base 20 contains counterweight or rocker arm 40 which is held in place by pivot rod 45. Base 20 further contains a control spring 25 and adjustment screw 27. Cover 30 supports printed wiring board 50, which also houses opto-reflective sensing component 60 (not shown). Printed wiring board 50 communicates with an external control means through leads 55. Housings 30 and 20 are fastened together utilizing eyelets 35.

Base 20 further has differential air ports 22 and 23. Port 22 is a high pressure port and provides a reference pressure which is applied to the top portion of diaphragm assembly 10, the top being the portion near cover 30. The reference pressure is the ambient pressure. Port 22 provides the ambient pressure to the top portion of diaphragm assembly 10 by first passing internally through opening A in base 20. The air is allowed to pass through gasket 16 of diaphragm assembly 10 by means of hole B. The air then passes through a slot (not shown) in cover 30. The slot allows the air to pass into the cavity on the high pressure side of diaphragm assembly 10.

Port 23 is a low pressure port and provides the sensed pressure to diaphragm 10. The sensed pressure is a negative pressure with respect to the reference pressure, and is applied to the bottom of diaphragm 10, the bottom of diaphragm assembly being nearer base 20.

In the present embodiment, printed wiring board 50 is not well sealed to cover 30. This is acceptable for this embodiments the high pressure side of diaphragm assembly 10 is connected to the ambient pressure. If the switch were to be used as a true differential switch, a seal would be needed between printed wiring board 50 and cover 30.

Figure 2:
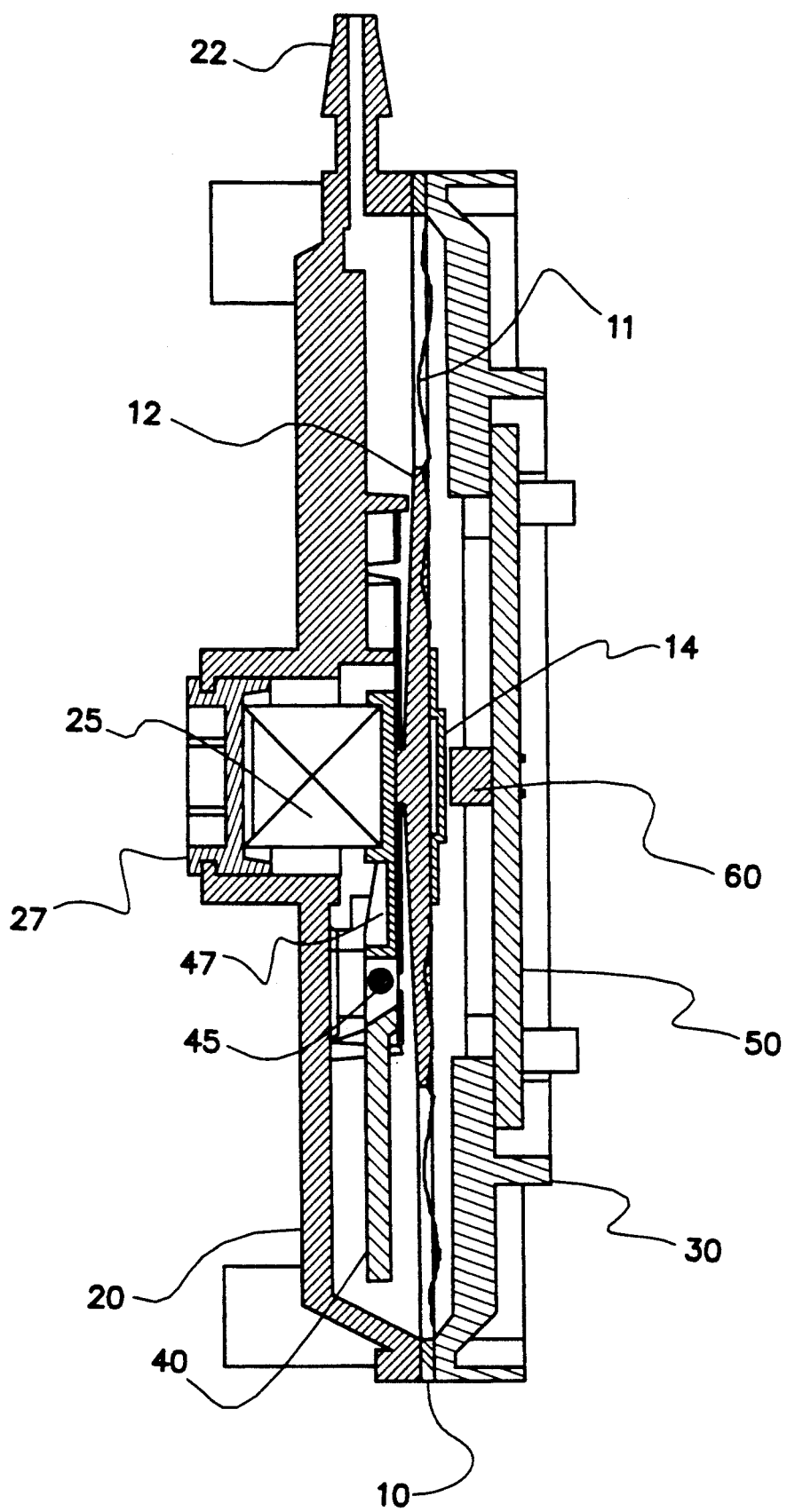
FIG. 2 illustrates the assembled preferred embodiment illustrated in FIG. 1.
Figure 4:
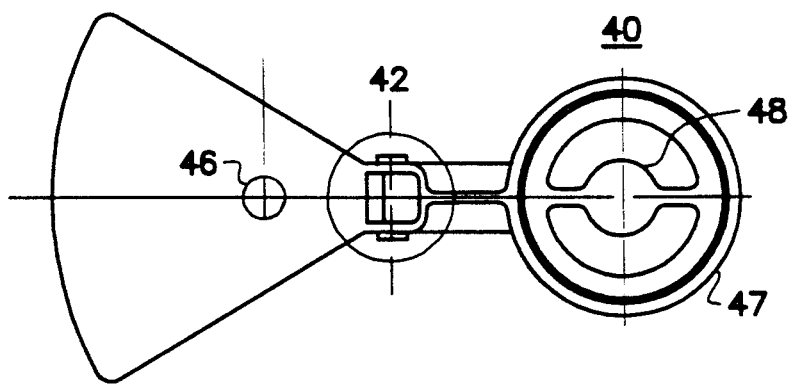
FIG. 4 illustrates the control arm.

FIG. 2 illustrates the assembled airflow switch. Opto-reflective sensor 60 is positioned on printed wiring 50 such that it is centered on reflector plate 14. Inner arm 47 of counterweight mechanism 40 has inner arm center 48 (as shown in FIG. 4) centered on the center of plate support 12. Inner arm 47 also is in contact and retains spring 25. Counterweight mechanism 40 pivots about rod 45. In this manner, the combination of center of gravity 46, spring 25 and the weight of plate support 12 and plate 14 enables the airflow sensor to be mounted in any position without regard to orientation. As counterweight mechanism 40 provides a counterweight against spring 25 and the opposing weight of plate 14 and plate support 12.

Figure 3:
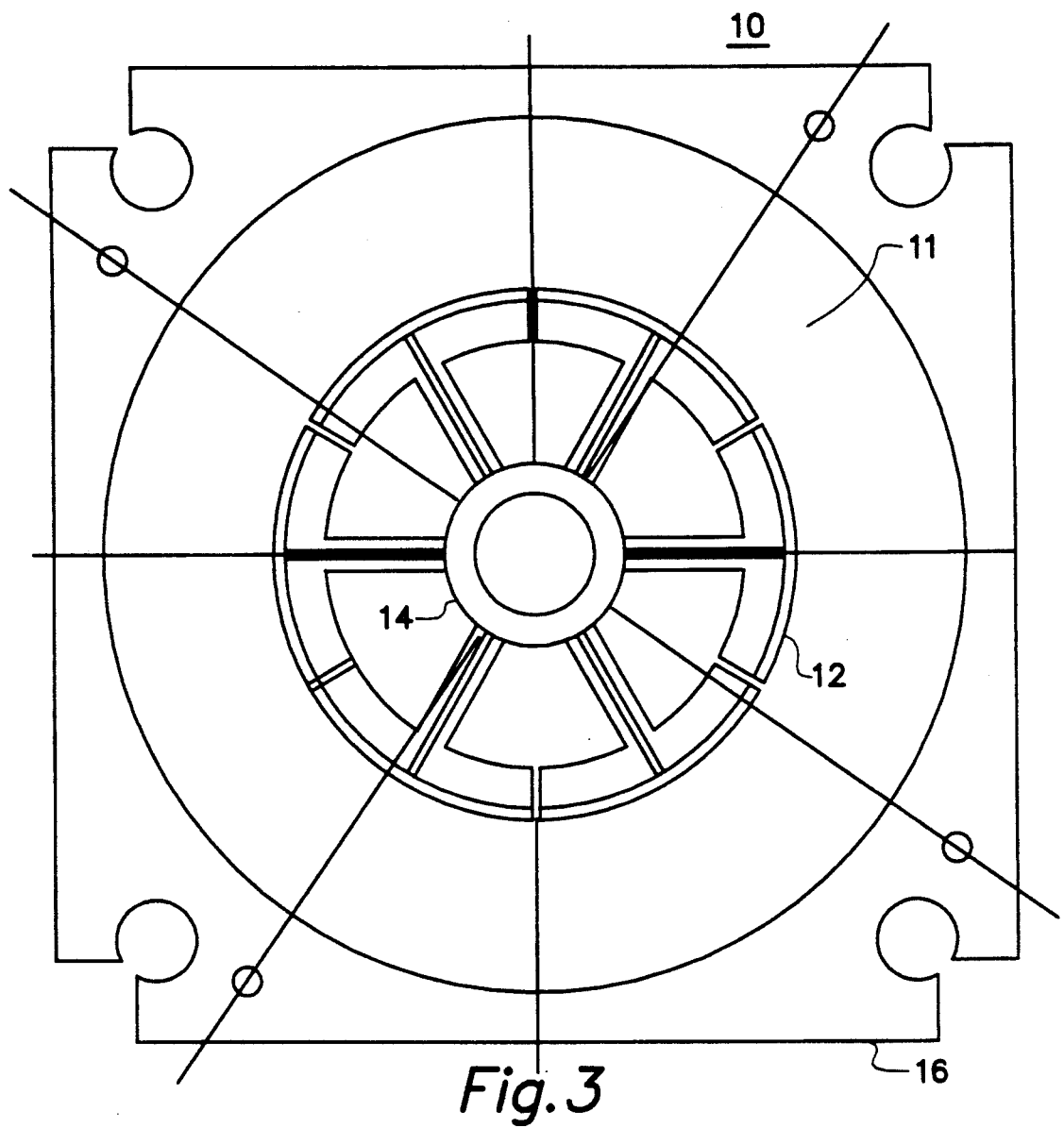
FIG. 3 illustrates the diaphragm for the pressure sensor.

FIG. 3 illustrates diaphragm assembly 10 of FIGS. 1 and 2. Diaphragm assembly 10 is a 0.0002 inches thin polycarbonate diaphragm 11 which utilizes plate support 12 in the center to increase the "effective area" of diaphragm assembly 10. The use of a support plate is common to this type of pressure sensor. The effective area of the diaphragm can be thought of as the ratio of force generated at plate 14 to the pressure differential applied. For a diaphragm without a support plate, the effective area is approximately equal to the area of a circle with a radius equal to half of the total diaphragm radius. If a support plate is used, the approximate effective area would be equal to the area of a circle with a radius equal to the average of the radius of the support plate and the total diaphragm radius.

Polycarbonate diaphragm 11 is mounted on a gasket 16 in order that it may be sealed between base 20 and cover 30. Gasket 16 is urethane foam with a layer of polyester film adhered to it to give it rigidity. Polycarbonate diaphragm 11 is mounted to gasket 16 with an adhesive. Polycarbonate diaphragm 11 is mounted to gasket 16 with a "pucker" or "bagginess". This looseness of polycarbonate diaphragm 11 is critical to the free movement of plate 14 and support plate 12. To do this, polycarbonate diaphragm 11 is not stretched, it is gathered with small folds around its perimeter as it is sealed.

Reflector plate 14 is an optical reflector and is made up of a white nylon reflector made of Dupont Zytel 101 with 8 lb./100 lb. of white colorant. Reflector plate 14 is utilized to reflect the output signal from opto-reflective sensor 60. Reflector plate 14 is ultrasonically bonded to plate support 12 with polycarbonate diaphragm 11 between them.

FIG. 4 illustrates counterweight mechanism 40. Counterweight mechanism 40 has a pivot point located about axis 42 which rod 45 is inserted there through. The center of gravity 46 is located on the outer arm of counterweight mechanism 40. Counterweight mechanism 40 is made of Teflon filled acetal (Dupont Derlin 500 AF) to minimize friction at the pivot point. The weight of counterweight mechanism 40 and the distance from axis 42 to center of gravity 46 is tuned to exactly counter the combined weights of plate support 12 and plate 14 at the inner arm center 48.

The function of the switch is to sense low pressure with respect to the pressure immediately surrounding the switch. The airflow switch is constructed with coil spring 25 and counterweight mechanism 40 so that its setpoint does not change with physical orientation of the pressure sensor. Counterweight 40 and control spring 25 hold the diaphragm against opto-reflective sensor 60. Adjustment screw 27 is used to adjust spring 25 pressure during calibration of airflow switch 1. Spring 25 has a low spring rate (8 grams/in.). The low spring pressure is utilized so that diaphragm assembly 10 moves significant distances with small increases in pressure. For the present embodiment, once the force holding diaphragm assembly 10 to opto-reflective sensor 60 is overcome, diaphragm assembly 10 moves quickly away with an increasing pressure differential. To utilize the switch as a pressure sensor to calculate the actual pressure differential, the spring rate would need to be increased.

When there is no pressure, thin polycarbonate film diaphragm 10 with molded plastic support plates 12 is held against opto-reflective sensor 60. As negative pressure is applied, diaphragm 10 pulls away from opto-reflective sensor 60. Opto-reflective sensor 60 has a characteristic of receiving more reflective input as diaphragm 10 moves away from it until a peak is reached at approximately 0.8 mm. When the reflective input to opto-reflective sensor 60 reaches a set level, airflow switch 1 engages the electronic air cleaner.

Figure 7:
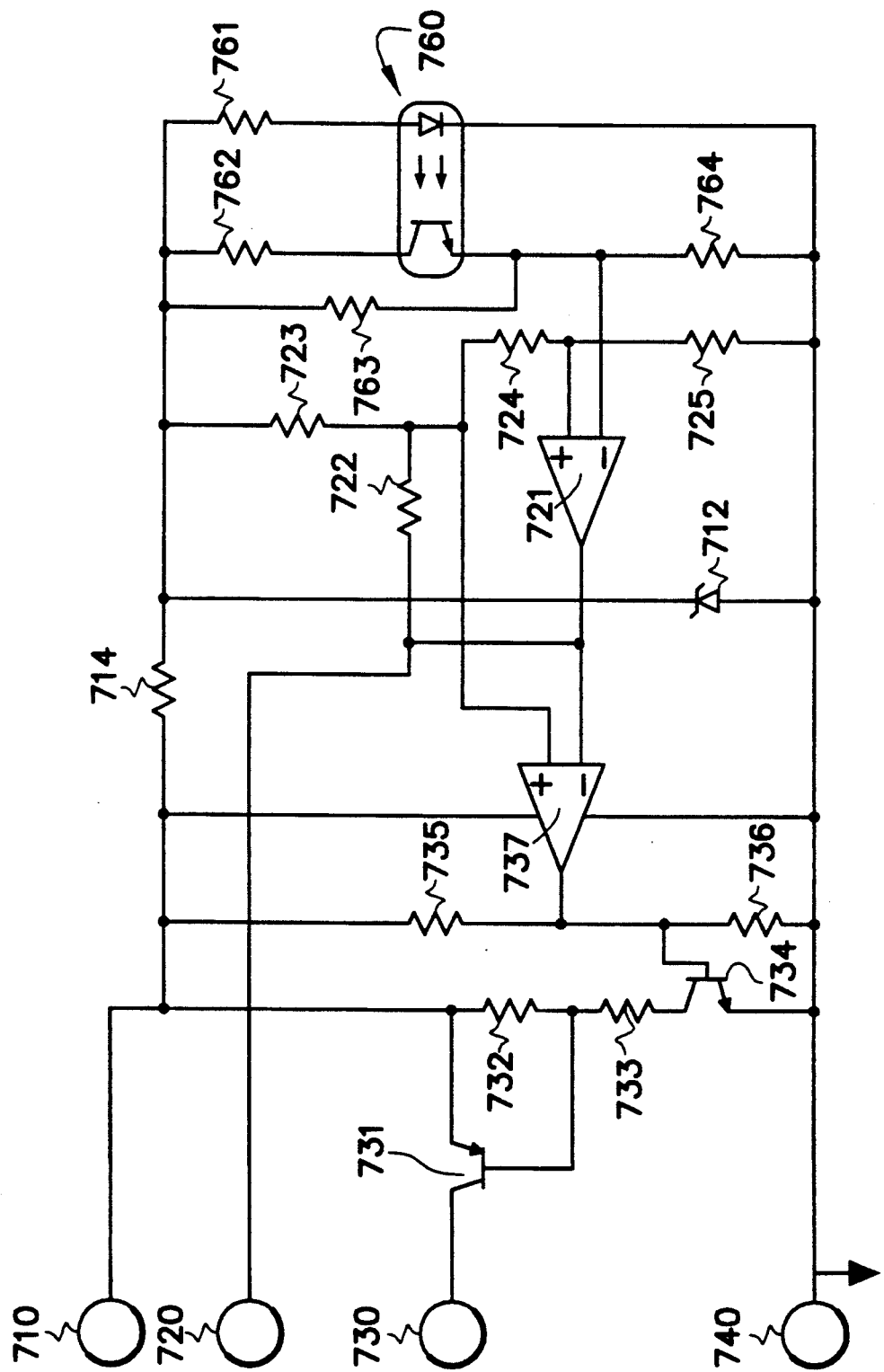
FIG. 7 illustrates a simplified circuit utilized for an airflow sensor switch.

The switch circuit has two outputs. FIG. 7 is the schematic diagram for the switch circuit. The first output is grounded when the preset pressure is reached.

This output is connected to the "shutdown" pin of the power supply control IC. The second output supplies a voltage equal to the input voltage when the preset pressure is reached. This output is used to operate the performance-indicated driver board of the power supply.

Figure 5:
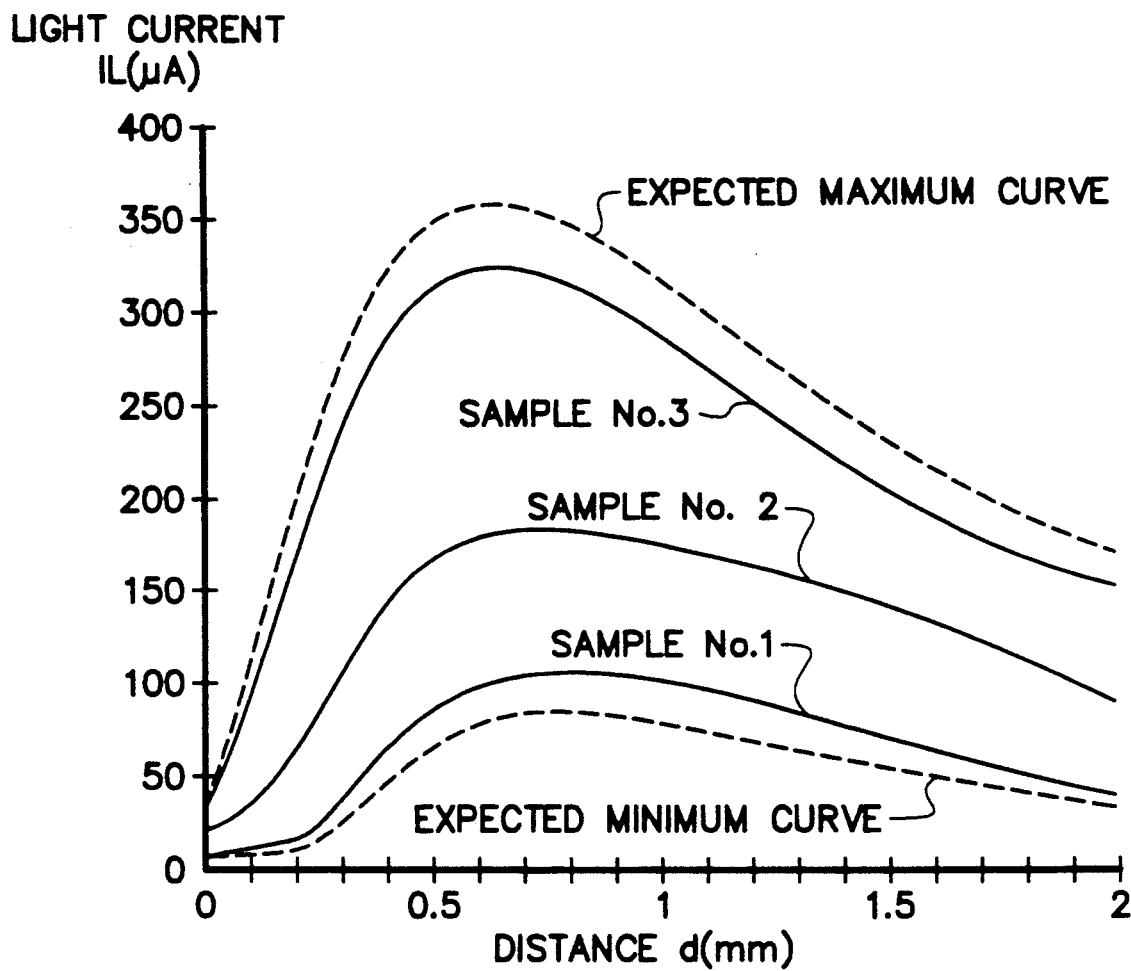
FIG. 5 illustrates light current versus distance response of an opto-reflective sensor on plate 14.
Figures 6A, 6B:
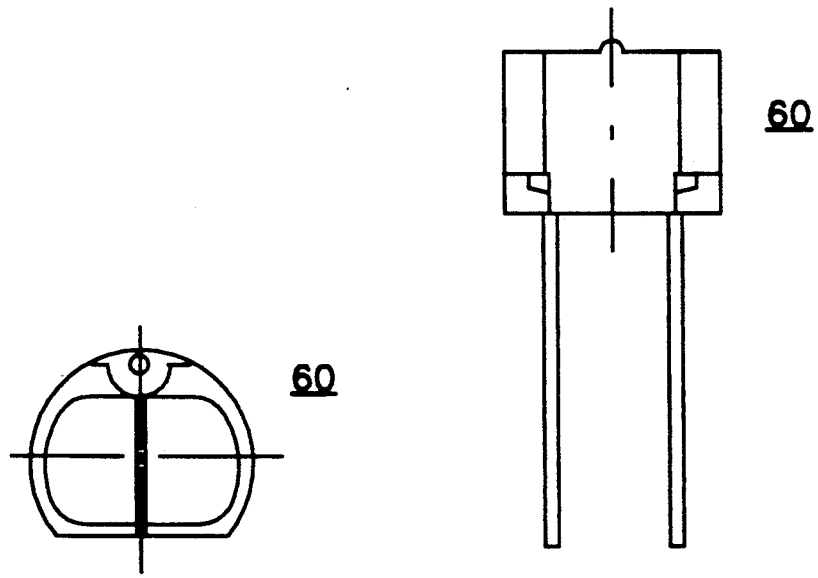
FIGS. 6a and 6b illustrate the opto-reflective sensor.

FIG. 5 illustrates the light current in micro amps versus the distance plate 14 is from the face of opto-reflective sensor 60. As can be seen from FIG. 5, the output of opto-reflective sensor 60 is essentially linear until a distance of 0.8 mm is reached. At that point, the output begins to decrease the greater the distance plate 14 is from opto-reflective sensor 60. The curves of FIG. 5 illustrate the expected maximum curve, the expected minimum curve and three samples which were tested from an Omron supplier of an opto-reflective sensor. The opto-reflective sensor tested was a photo-microprocessor, Part Number EESY101-R12. This part can be obtained from Omron Tateisi Electronics Company of Japan. Opto-reflective sensor 60 is illustrated in FIGS. 6a and 6b. Opto-reflective sensor 60 is also available from Sharp, which is located in Mahwah, N.J., the part number is GP2S22A. As seen in FIG. 4, there is a large variation in the light current for a particular distance for the opto-reflective sensors. Therefore, prior to utilizing an opto-reflective sensor in this device, the opto-reflective sensor must be selected or screened to select opto-reflective sensors which are closer to the expected maximum curve for the light current versus distance graph. This is due to the use which most opto-reflective sensors are utilized for. Most opto-reflective sensors are utilized for the purpose of determining if something has passed by the opto-reflective sensor and not for determining if something has increased or decreased in distance from the opto-reflective sensor. However, by utilizing higher quality opto-reflective sensors, it is possible to not only determine when to switch on an air cleaner, but utilizing a microprocessor it is possible to determine the pressure differential the pressure sensor detects. Such a device may be utilized for determining pressure differentials in zones in a building for building control devices.

I claim:

1. A differential pressure sensor comprising:
   a diaphragm with a first means having a mass, said first means being mounted on said diaphragm, said first means being utilized to determine a position of said diaphragm relative to a first position;
   a housing containing said diaphragm, said housing having a first and a second inlet port, said first inlet port providing a first pressure to a first side of said diaphragm, said second inlet port providing a second pressure to a second side of said diaphragm, said diaphragm moving toward the lesser of said pressures; and
   a counterweight mechanism having a first axis, an inner arm and an outer arm wherein said inner arm and said outer arm pivot about said axis, said inner arm being in contact with said first means, said counterweight mechanism having a center of gravity, said center of gravity being located on said outer arm, wherein said counterweight mechanism counters said mass of said first means whereby said differential pressure sensor may be mounted in any orientation.

2. The differential pressure sensor of claim 1 further comprising a spring, said spring holding said counter weight mechanism in contact with said diaphragm.

3. The differential pressure sensor of claim 1 wherein said first means is further utilized to increase the effective area of said diaphragm.

4. The differential pressure sensor of claim 3 further comprising a spring, said spring holding said counter weight mechanism in contact with said diaphragm.

5. The differential pressure sensor of claim 3 wherein said axis comprises a pivot rod mounted in said housing, said wherein said inner arm and said outer arm pivot about said pivot rod.

6. The differential pressure sensor of claim 5 further comprising a spring, said spring holding said counter weight mechanism in contact with said diaphragm.

7. The differential pressure sensor of claim 1 wherein said first pressure is ambient pressure.

8. The differential pressure sensor of claim 7 further comprising a spring, said spring holding said counter weight mechanism in contact with said diaphragm.

9. The differential pressure sensor of claim 7 wherein said first means is further utilized to increase the effective area of said diaphragm.

10. The differential pressure sensor of claim 9 wherein said axis comprises a pivot rod mounted in said housing, said wherein said inner arm and said outer arm pivot about said pivot rod.

11. A differential pressure sensor comprising:
    a diaphragm with a first means having a mass, said first means being mounted on said diaphragm, said first means being utilized to increase the effective area of said diaphragm;
    a housing containing said diaphragm, said housing having a first and a second inlet port, said first inlet port providing a first pressure to a first side of said diaphragm, said second inlet port providing a second pressure to a second side of said diaphragm, said diaphragm moving toward the lesser of said pressures; and
    a counterweight mechanism having a first axis, an inner arm and an outer arm wherein said inner arm and said outer arm pivot about said axis, said inner arm being in contact with said first means, said counterweight mechanism having a center of gravity, said center of gravity being located on said outer arm, wherein said counterweight mechanism counters said mass of said first means whereby said differential pressure sensor may be mounted in any orientation.

12. The differential pressure sensor of claim 11 further comprising a spring, said spring holding said counter weight mechanism in contact with said diaphragm.

13. The differential pressure sensor of claim 11 wherein said first pressure is ambient pressure.

14. The differential pressure sensor of claim 13 further comprising a spring, said spring holding said counter weight mechanism in contact with said diaphragm.

15. A differential pressure sensor comprising:
    a diaphragm having a mass;
    a housing containing said diaphragm, said housing having a first and a second inlet port, said first inlet port providing a first pressure to a first side of said diaphragm, said second inlet port providing a second pressure to a second side of said diaphragm, said diaphragm moving toward the lesser of said pressures; and
    a counterweight mechanism having a first axis, an inner arm and an outer arm wherein said inner arm and said outer arm pivot about said axis, said inner arm being in contact with said diaphragm, said counterweight mechanism having a center of gravity, said center of gravity being located on said outer arm, wherein said counterweight mechanism counters said mass of said diaphragm whereby said differential pressure sensor may be mounted in any orientation.

16. The differential pressure sensor of claim 15 wherein said first pressure is ambient pressure.

17. A differential pressure sensor comprising:
a diaphragm having a mass;
a housing containing said diaphragm, said housing having a first and a second inlet port, said first inlet port providing a first pressure to a first side of said diaphragm, said second inlet port providing a second pressure to a second side of said diaphragm, said diaphragm moving toward the lesser of said pressures; and
a counterweight mechanism wherein said counterweight mechanism counters said mass of said diaphragm whereby said differential pressure sensor may be mounted in any orientation.

18. The differential pressure sensor of claim 17 wherein said first pressure is ambient pressure.

* * * * *